US009628427B2

(12) United States Patent
Chiu (10) Patent No.: US 9,628,427 B2
(45) Date of Patent: Apr. 18, 2017

(54) SYSTEM AND METHOD OF MAKING MESSAGES REMAIN ON TOP OF A MOBILE BULLETIN BOARD

(71) Applicant: MITAKE INFORMATION CORPORATION, Taipei (TW)

(72) Inventor: Hung-Che Chiu, Taipei (TW)

(73) Assignee: MITAKE INFORMATION CORPORATION, Taipei (TW)

( * ) Notice: Subject to any disclaimer, the term of this patent is extended or adjusted under 35 U.S.C. 154(b) by 7 days.

(21) Appl. No.: 14/705,194

(22) Filed: May 6, 2015

(65) Prior Publication Data
US 2016/0226810 A1 Aug. 4, 2016

(30) Foreign Application Priority Data

Jan. 30, 2015 (TW) .............................. 104103178 A (51) Int. Cl.
*H04L 12/58* (2006.01)
*H04L 29/08* (2006.01)
*H04L 12/18* (2006.01)

(52) U.S. Cl.
CPC .......... *H04L 51/26* (2013.01); *H04L 12/1859* (2013.01); *H04L 51/24* (2013.01); *H04L 67/26* (2013.01)

(58) Field of Classification Search
CPC ..... H04L 51/26; H04L 67/26; H04L 12/1859; H04L 51/24
USPC ....... 455/412.1–414.2, 418–421, 566, 550.1; 725/30, 109, 34, 116; 709/206, 246, 214, 709/223, 224; 705/10, 64, 5, 67, 37, 26, 705/27
See application file for complete search history.

(56) References Cited

U.S. PATENT DOCUMENTS

| | | | | |
|---|---|---|---|---|
| 8,296,380 | B1* | 10/2012 | Kelly | G06F 17/30528 703/23 |
| 8,645,014 | B1* | 2/2014 | Kozlowski | H04M 3/487 455/404.1 |
| 9,002,725 | B1* | 4/2015 | Carobus | G06Q 30/0256 705/14.54 |
| 2004/0234045 | A1* | 11/2004 | Hora | G06Q 10/10 379/88.13 |
| 2006/0035632 | A1* | 2/2006 | Sorvari | H04M 1/271 455/418 |
| 2008/0049919 | A1* | 2/2008 | Pounds | G06Q 30/0251 379/201.04 |
| 2010/0222025 | A1* | 9/2010 | Bosan | G06Q 30/02 455/412.1 |
| 2012/0260194 | A1* | 10/2012 | Kennedy | G06Q 30/04 715/752 |
| 2014/0157148 | A1* | 6/2014 | Joo | H04L 51/32 715/752 |

(Continued)

Primary Examiner — Babar Sarwar
(74) Attorney, Agent, or Firm — Bacon & Thomas, PLLC (57) ABSTRACT

A system and method of making messages remain on top of a mobile bulletin board are provided. The system includes a database, a server, a push gateway, and a mobile communication device. A cloud is composed of the database, the server, and the push gateway. The server generates a bulletin board message. The bulletin board message is delivered as a push notification to the mobile communication device of a corresponding member through the push gateway and an external push server, such that the bulletin board message is made compulsory remain-on-top displayed on the mobile communication device.

40 Claims, 6 Drawing Sheets

(56) References Cited

U.S. PATENT DOCUMENTS

2015/0242585 A1* 8/2015 Spiegel .............. G06F 19/3418
705/2
2015/0364057 A1* 12/2015 Catani ................ G09B 19/0092
434/127

* cited by examiner

SYSTEM AND METHOD OF MAKING MESSAGES REMAIN ON TOP OF A MOBILE BULLETIN BOARD

BACKGROUND OF THE INVENTION

Field of the Invention

The present invention relates to cloud technology applicable to mobile communication devices, and more particularly, to a system and method of making messages remain on top of a mobile bulletin board.

Description of the Prior Art

Nowadays there are many message exchanging systems on mobile communication devices using cloud technology for society and organizations, but conventional mobile message delivery technology still has too many drawbacks to meet the needs for corporate governance.

Taiwan's Published Patent Application 201312971 (hereinafter referred to as "citation 1"), entitled Method of Receiving Message, discloses a method of receiving messages. The method is applicable to electronic devices. The method comprises the steps of: receiving a message; getting connected to a server according to the IP built in an electronic device upon the receipt of the message; retrieving a multimedia file from the server; and downloading and playing the multimedia file. The technical problem to be solved by citation 1 is as follows: the frame for displaying a short message is primitive, because the frame merely displays the contents of the short message and provides simple operation functions, such as editing short messages. Users who often keep in touch with each other by short messages not only attach great importance to prompts but also regard a robust short message interface important" (see citation 1, the specification, paragraph [0002]). The technical effect produced by citation 1 is "downloading multimedia files through messages."

Taiwan Patent 573268, entitled Channel Subscription, Push System, and Method Thereof (hereinafter referred to as "citation 2"), discloses channel subscription, a push system, and a method thereof, wherein a user connects a mobile communication device to a WML server so as to subscribe to a channel. The WML server produces a subscription list and assigns code SS DTD to the subscription list. An SQL server not only receives and stores SSDTD but also determines whether information pertaining to the channel has been updated in accordance with SS DTD. If the determination is affirmative, the SQL server sends an update message to a push server, such that the push server receives the update message and pushes the update message to the mobile communication device. The mobile communication device receives the update message, and then the user connects the mobile communication device to the WML server in accordance with the update message, so as to download the latest information. The technical problems to be solved by citation 2 are as follows: "1. the user must take the initiative in making an inquiry to check whether the previously subscribed information has been updated, and in consequence the user cannot be informed of the latest message in a real-time manner; 2. the information received by the user is seldom categorized, organized, or managed, and in consequence it is not reader-friendly; and 3. In general, although the subscribed information is received by the mobile communication device, it cannot be categorized, organized, or managed, thereby precluding the user from subscribing to multiple messages" (see citation 2, the specification, Background of the Invention, last paragraph). The technical effect produced by citation 2 is as follows: as soon as information of a channel is updated, a user is informed of the update by push technology so that the user can learn about the latest information instantly; and the channel-related information received by the user is categorized, organized, and managed, such that the user can read it easily."

Taiwan Patent I359600 (hereinafter referred to as "citation 3"), entitled Method and System of Subscribing to Mobile Channel Having Delivered Content, discloses a method and system of creating a delivered content for channel subscription in a mobile network, comprising the steps of: creating a subscription from a content provider and a mobile apparatus in the mobile network; and delivering a delivered content to a delivery server. The technical problem to be solved by citation 3 is as follows: " . . . the other alternatives include push and broadcast or community broadcast which complies with SMS; in case of broadcast, it is impossible to standardize delivery in order to meet the requirement of the capability of a specific apparatus or a specific user; therefore the systems do not have intelligence associated with them" (see citation 3, the specification, paragraph [0005]). The technical effect produced by citation 3 is as follows: provide a subscription model and topology, wherein both a subscribed information and a delivered content are sent to a delivery server or a content provider.

Citation 4 is directed to providing message exchange service within an organization at an individual-to-individual or single level by a cloud, a mobile communication device, and push technology, as well as, for example, "Line" application and a back-end system thereof developed by Japan-based LINE Corporation, a subsidiary of South Korea-based NHN, and Facebook's "WhatsApp" application and a back-end system thereof. The drawback of citation 4 is that the organizations each have only one level and thus fail to meet the multi-level requirement of corporate governance. The technical problem to be solved by citation 4 is as follows: message contents sent through conventional short messages are not diverse enough to bridge the gap of communication vividly and flexibly. The technical effect produced by citation 4 is as follows: providing message exchange service within an organization at an individual-to-individual or single level and rendering message pictures more vivid and flexible.

None of the systems and methods of the aforesaid citations embodies any technology of making messages remain on top compulsorily, that is, displaying important bulletin board messages compulsorily in a priority display block of a screen, but allowing a message-receiving mobile communication device to mark and indiscriminately display the important messages and general messages in accordance with a message receiving sequence or message receiving time, and in consequence the important messages are unlikely to catch the eye of the user while the user is browsing the bulletin board messages. Furthermore, the systems and methods of the aforesaid citations have another disadvantage: the screen of the bulletin board is not divided into display blocks whereby the important messages are rendered conspicuous to the user. Moreover, none of the systems and methods of the citations embodies any technology of "displaying multiple important bulletin board messages in a round-robin manner automatically," and in consequence the technical solutions and effects of the citations have nothing to do with "mobile bulletin boards".

Regarding the needs for enterprise message management, the rank or authority of a person working at a specific organizational level and posting important messages on a bulletin board does matter. As a result, the systems and methods of the citations fail to meet the needs of a person with a high rank or authority at a specific organizational level for informing the other organization members of his or her important messages, as well as the need of the mobile communication device to put the important messages in a display block whereby the important messages are rendered conspicuous to the other members browsing the bulletin board messages.

The cause of the aforesaid drawbacks of the citations is as follows: hardware resources of a cloud server do not collect or record a bulletin board member's rank or authority at an organizational level, and in consequence bulletin board messages are not configured to distinguish important messages, thereby denying the members' mobile communication devices access to any reference for displaying the important messages on the screen conspicuously. Hence, it is necessary to provide a cloud system and cloud method for use in enterprise message management of a mobile bulletin board as well as a mobile communication device and method of accessing the cloud system, so as to make important messages of the mobile bulletin board, through resources available to the cloud, having attributes which are compulsory remain-on-top, displaying in a round-robin manner automatically and eye-catching, enable hardware resources of the mobile communication devices to display the important messages on the screen conspicuously in accordance with attribute configuration, and allow organization members to spot important messages with higher priority among numerous messages on the mobile bulletin board instantly, thereby overcoming the drawbacks of the prior art.

SUMMARY OF THE INVENTION

In view of the aforesaid drawbacks of the prior art, the present invention provides a system and method of making messages remain on top of a mobile bulletin board and a mobile communication device capable of accessing a cloud, so as to make important messages of the mobile bulletin board, through resources available to the cloud, having attributes which are compulsory remain-on-top, displaying in a round-robin manner automatically and eye-catching, enable hardware resources of the mobile communication devices to display the important messages on the screen conspicuously in accordance with attribute configuration, and allow organization members to spot important messages with higher priority among numerous messages on the mobile bulletin board instantly.

The present invention provides a system of making messages remain on top of a mobile bulletin board. The system comprises a database, a server and a push gateway at a server end, and a mobile communication device at a client end. A cloud is formed from the database, the server, and the push gateway. The database stores at least one bulletin board message and a plurality of members' information. The bulletin board message comprises a message content, an attribute, and a recipient list. The attribute comprises a display position. The recipient list consists of a level or a member information or both. Each member information comprises an account number, a password, an organization, and an authority grade. The organization is a single-level organization or a multi-level organization. The server accesses the database and comprises: a first network communication module which has a network connection with a mobile communication device associated with one of the members' information; a login verification module for verifying the mobile communication device connects with the server through a network, or receiving the uploaded account number and password to thereby perform verification thereon; an authority management module for responding to a remain-on-top instruction or a remain-on-top cancellation instruction and thereby resetting a display position of the message content according to the authority grade of the account number and managing authority required for sending the bulletin board message to the levels according to the authority grade associated with the message content, wherein the bulletin board message is prohibited from being sent to the levels when the authority grade of the account number is inappropriate; and a first bulletin board module for receiving the uploaded bulletin board message, writing the bulletin board message to the database, and producing a recipient push list according to the recipient list of the bulletin board message, wherein the recipient push list comprises at least one push ID corresponding to one of the members' information. The push gateway produces a push notification according to the bulletin board message and sends the push notification to the mobile communication device corresponding to the recipient push list through an external push server. The push notification comprises a push notification serial number. After the mobile communication device downloads the bulletin board message from the server in accordance with the push notification serial number, the mobile communication device determines whether to display a summary of the message content in a priority display block according to the attribute.

According to the present invention, the mobile communication device which accesses the cloud comprises at least one processor and a screen. Resources for use in executing an application by the processor comprises: a second network communication module for establishing a network connection with the first network communication module of the server; a login module for receiving the account number and the password entered by the user and uploading the account number and the password to the server through the second network communication module; a data access module for receiving the push notification, triggering the second network communication module to establish a network connection with the first network communication module of the server, and downloading from the server the bulletin board message corresponding to the push notification serial number, wherein the bulletin board message comprises the attribute, and the attribute comprises the display position; a second bulletin board module for dividing vertically a view displayed on the screen into a priority display block and a non-priority display block disposed beneath the priority display block, wherein a vertically scrolling instruction is received for scrolling up and down the view, such that not only a summary of the bulletin board message is displayed in the priority display block or the non-priority display block in accordance with an arrangement sequence and in accordance with the display position, but a selecting instruction for the summary is also received so as to display the full contents of the bulletin board messages; and a remain-on-top management module for checking the attribute of the bulletin board message. The summary of the bulletin board message is processed by the second bulletin board module and displayed in the priority display block when the display position of the attribute is the priority display block. The summary of the bulletin board message is processed by the second bulletin board module and displayed in the non-priority display block when the display position of the attribute is the non-priority display block. When more than one bulletin board message is disposed in the priority display block, the remain-on-top management module disposes another bulletin board message by transverse expansion and receives a horizontally scrolling instruction for scrolling the priority display block leftward and rightward, thereby switching between the bulletin board messages displayed in the priority display block. Moreover, the remain-on-top management module receives a remain-on-top instruction for setting the display position to the priority display block and uploading the remain-on-top instruction to the server. Furthermore, the remain-on-top management module receives a remain-on-top cancellation instruction for setting the display position to the non-priority display block and uploading the remain-on-top cancellation instruction to the server. Moreover, the remain-on-top management module receives a round-robin configuration instruction for starting and shutting down the automatic round-robin display of the priority display block.

Moreover, the resources for use in executing the application by the processor further comprises a bulletin board message entering module for entering the bulletin board message, the attribute of the bulletin board message, and the recipient list, and uploading them to the server through the second network communication module.

The application comprises a plurality of program instructions. The program instructions include: a first program instruction for instructing the mobile communication device to establish a network connection with the server and thereby undergo login verification; a second program instruction for instructing the mobile communication device to receive the push notification and then download from the server the bulletin board message corresponding to the push notification serial number; a third program instruction for instructing the mobile communication device to display the message content on a screen, wherein a view of the screen is divided into the priority display block and a non-priority display block disposed beneath the priority display block; and a fourth program instruction for determining whether to display the summary of the message content in the priority display block or the non-priority display block according to the attribute.

The present invention provides a method of making messages remain on top of a mobile bulletin board, applicable to a cloud formed from a server, a database, and a push gateway, the method comprising the steps of: storing at least one bulletin board message and a plurality of members' information in the database, wherein the bulletin board message comprises a message content, an attribute, and a recipient list selected from a level and the members' information, wherein the members' information each comprise an account number, a password, an organization, and an authority grade, wherein the organization is a single-level organization or a multi-level organization; establishing a network connection between the server and a mobile communication device associated with one of the members' information, wherein the server receives the account number and the password uploaded by the mobile communication device so as to verify login of the mobile communication device; receiving the bulletin board message uploaded by the mobile communication device and writing the bulletin board message to the database, by the server, wherein the bulletin board message comprises a message content, an attribute, and a recipient list, wherein the attribute comprises a display position, wherein the recipient list consists of the levels or the members' information; performing mapping and producing a recipient push list by the server according to the recipient list and the database, wherein the recipient push list comprises at least one push ID corresponding to one of the members' information; producing a push notification by the push gateway according to the bulletin board message, wherein the push notification comprises a push notification serial number, wherein the push notification is sent to the mobile communication device corresponding to the recipient push list through a push server; and receiving by the server the push notification serial number uploaded and enquired about by the mobile communication device, providing by the server the bulletin board message corresponding to the push notification serial number, so as for the bulletin board message to be downloaded by the mobile communication device, or providing by the server the bulletin board message corresponding to the push notification, so as for the bulletin board message to be downloaded by the mobile communication device corresponding to one of the members' information. After the mobile communication device downloads the bulletin board message from the server in accordance with the push notification, the mobile communication device determines whether to display a summary of the message content in a priority display block according to the attribute included in the bulletin board message.

The present invention provides a method of making messages remain on top of a mobile bulletin board, applicable to a mobile communication device for accessing a cloud, with the cloud formed from a database, a server, and a push gateway, wherein the database stores at least one bulletin board message and a plurality of members' information, wherein each member information comprises an account number, a password, an organization, and an authority grade, wherein the bulletin board message comprises a message content, an attribute, and a recipient list, wherein the mobile communication device has a screen and executes an application for implementing the method. The method comprises the steps of: receiving a push notification by the mobile communication device associated with one of the members' information, wherein the push notification comprises a push notification serial number; establishing a network connection with the server, receiving the entered account number and password, and uploading the account number and password to the server to undergo login verification; downloading from the server a bulletin board message corresponding to the push notification serial number; displaying the message content on the screen, wherein a view of the screen is vertically divided into a priority display block and a non-priority display block disposed beneath the priority display block, wherein a vertically scrolling instruction is received for scrolling up and down the view; checking an attribute of the bulletin board message, displaying a summary of the bulletin board message in the priority display block when a display position of the attribute is the priority display block, displaying the summary of the bulletin board message in the non-priority display block when the display position of the attribute is the non-priority display block; disposing another bulletin board message by transverse expansion when more than one bulletin board message is disposed in the priority display block, starting a horizontally scrolling operation mode to receive a horizontally scrolling instruction for switching between the bulletin board messages disposed in the priority display block; and determining whether to display a summary of the message content in the priority display block or the non-priority display block according to the attribute or receiving a selecting instruction for the summary so as to display the full contents of the bulletin board messages.

The embodiments below describe the features and advantages of the present invention in detail, and its contents is sufficient to allow any person skilled in the art to understand the technical contents of the present invention and implement it accordingly. The disclosure of the specification, claims, and drawings enable any person skilled in the art to understand the objectives and advantages of the present invention easily.

DETAILED DESCRIPTION OF THE EMBODIMENTS

Figure 1:
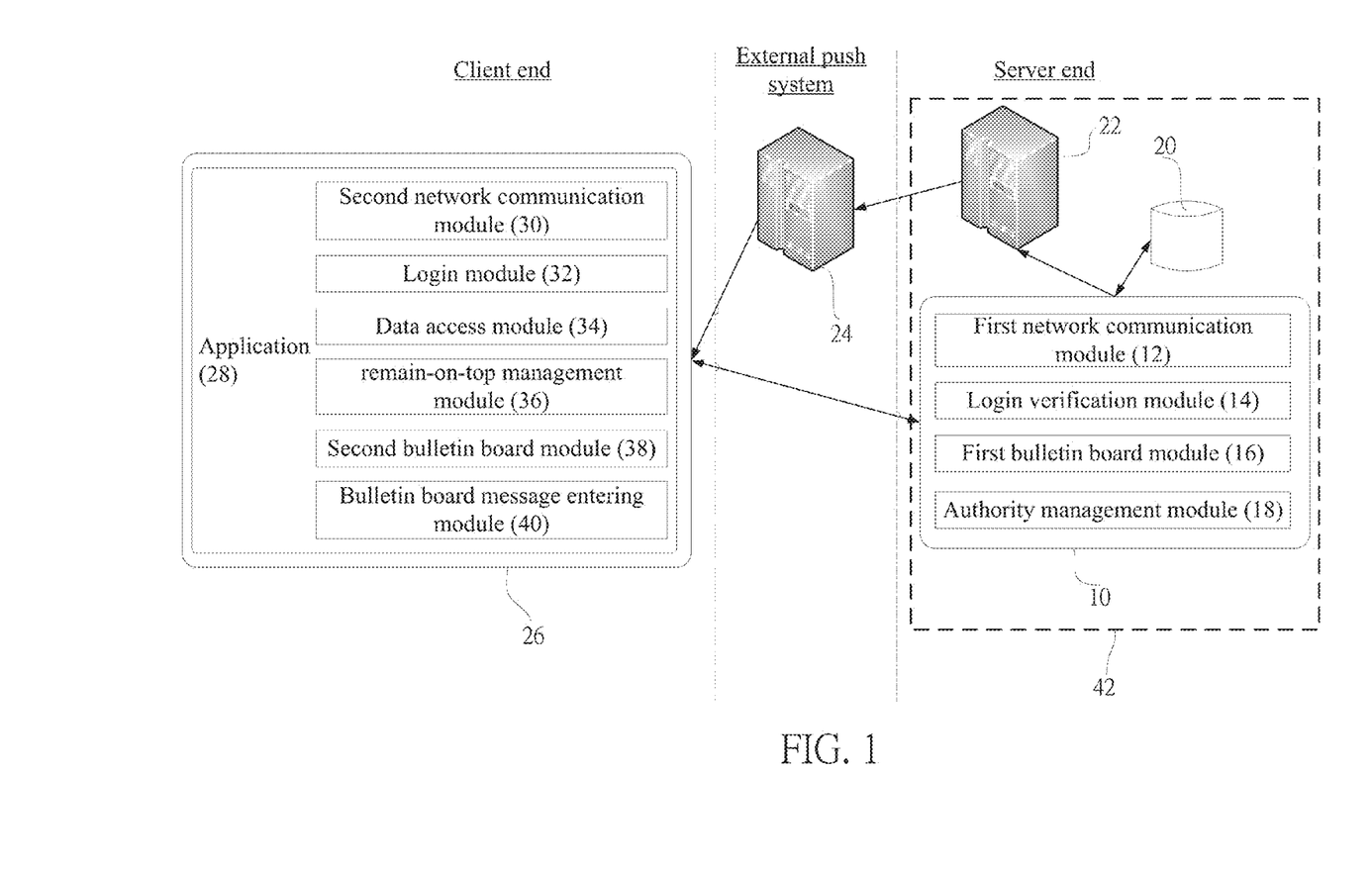
FIG. 1 is a schematic view of the system architecture according to an embodiment of the present invention.

Referring to FIG. 1, there is shown a schematic view of the system architecture according to an embodiment of the present invention. The system of the present invention comprises a database 20, a server 10 and a push gateway 22 at a server side (i.e., a cloud 42), and a mobile communication device 26 at a client side. The server side sends push notification to the client side via an external push system; however, the external push system is illustrative rather than restrictive of the present invention. The database 20 stores a plurality of bulletin board messages and a plurality of members' information. The bulletin board messages each include a message content, an attribute, and a recipient list (i.e., the subjects which the bulletin board messages are to be delivered to). The attribute includes a display position (on the screen of the mobile communication device 26, as the bulletin board message is displayed at the display position.) The members' information each includes an account number, a password, an organization, and an authority grade. The "organization" is, for example, a society or an organization. The organization is a single-level organization or a multi-level organization, which includes at least one member. The term "level" refers to the structure of an organization. A single-level organization, which is exemplified by a table tennis club or a family, consists of a relatively small number of members; hence, its members need not be defined by level. By contrast, a multi-level organization is, for example, structured by duty at four levels, namely business groups, departments, divisions, sections, or structured by member position at 15 levels, namely job grade 1, job grade 2 . . . job grade 15. The recipient list consists of a level or a member or both; hence, the recipient list consists of a department (such as a business department), a specific member, or "a department plus other specific members" (for example, the whole business department plus some other members of different departments).

In the embodiment of the present invention, the server 10 accesses the database 20, comprises at least one processor, and implements by means of coordinated operation of hardware and software the following modules: a first network communication module 12, a login verification module 14, a first bulletin board module 16, and an authority management module 18. The first network communication module 12 establishes a network connection with the second network communication module 30 of the mobile communication device 26 at the client end. In various embodiments of the present invention, the network connection complies with TCP protocol (including Socket and WebSocket Connection), HTTP protocol, or HTTPS protocol. The login verification module 14 is in progress once the mobile communication device 26 has network connection with the server 10. The verification performed by the login verification module 14 entails receiving an account number and a password uploaded by a member of an organization through the mobile communication device 26. Afterward, the account number and the password are verified in accordance with the account number and the password of the members' information stored in the database 20. The first bulletin board module 16 receives the bulletin board message uploaded by the mobile communication device 26 and writes it to the database 20. A recipient push list is produced according to the recipient list of the bulletin board message. The recipient push list comprises at least one push ID corresponding to one of the members' information, wherein each push ID corresponds to the receiving device (i.e., the mobile communication device 26) of a member. To configure the subjects (i.e., the recipient list) which the bulletin board messages are to be delivered to, it is practicable to select, by ticking off, levels or members in an organization directory. The first bulletin board module 16 has to undergo mapping (by using the members' information stored in the database 20) in order to create the recipient push list (i.e., "push IDs" of selected members) from the subjects (i.e., "selected levels or members in the organization directory").

Figure 3:
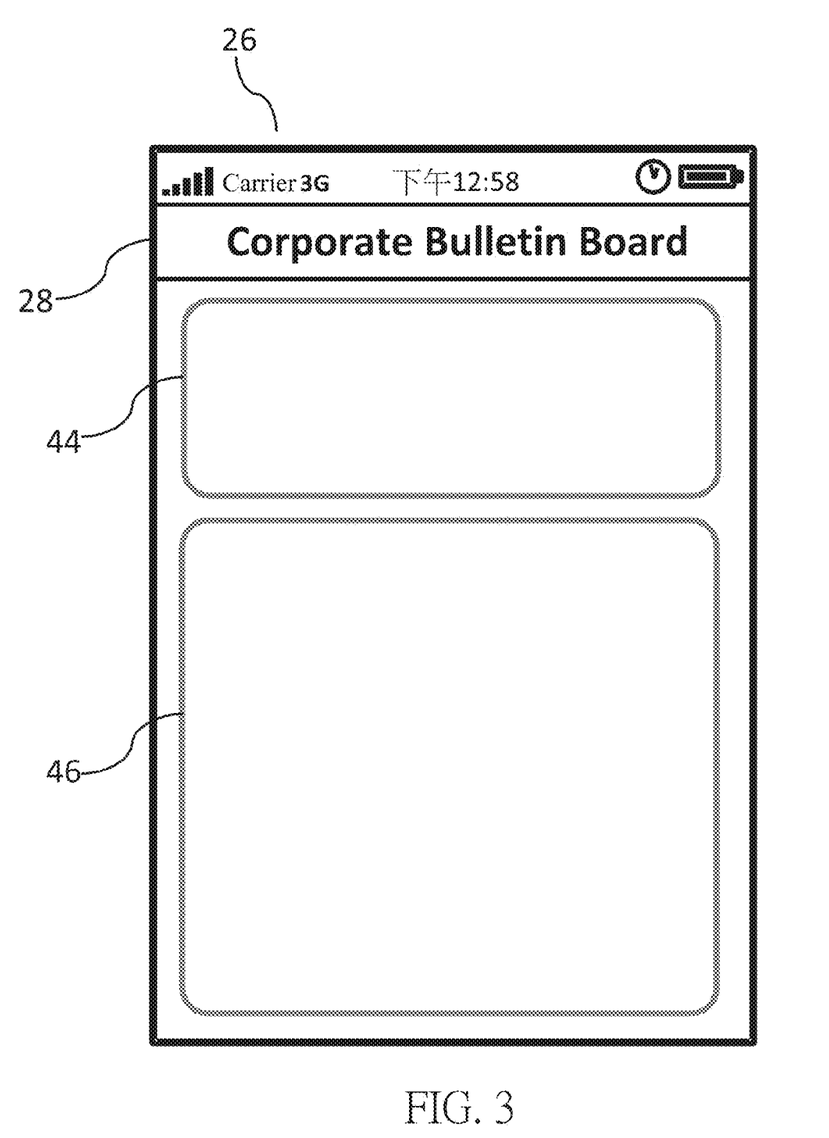
FIG. 3 is a schematic view of a priority display block and a non-priority display block according to an embodiment of the present invention.

In an embodiment of the present invention, the authority management module 18 receives a remain-on-top instruction and a remain-on-top cancellation instruction, which are uploaded by the mobile communication device 26 logged in with the account number, and resets the display position of the bulletin board message according to the authority grade of the account number. When a user logs in with the account number and operates the mobile communication device 26 to make a specific bulletin board message remain-on-top (producing and uploading the remain-on-top instruction) or remove remain-on-top (producing and uploading the remain-on-top cancellation instruction), the authority management module 18 resets the display position of the bulletin board message according to the authority grade of the user's account number. When the user has sufficient authority grade (for example, when the user is a supervisor or system administrator), the effective scope of the enforcement of the user's instructions extends to all the members who can read the bulletin board message. When the user's authority grade is insufficient, the effective scope of the enforcement of the user's instructions is restricted to the mobile communication device 26 in the possession of the user. For example, when a specific user has sufficient authority to operate the mobile communication device 26 and thereby make a bulletin board message remain-on-top (by generating and uploading the remain-on-top instruction), the authority management module 18 verifies authority, and then the mobile communication devices 26 of all the other members who can read the bulletin board message display a summary 48 of the bulletin board message in a priority display block 44. When the user does not have sufficient authority, only the mobile communication device 26 of the configuring user displays the summary 48 of the bulletin board message in the priority display block 44, but the mobile communication devices 26 of the other members still display the summary 48 of the bulletin board message in a non-priority display block 46.

In another embodiment of the present invention, the authority management module 18 manages the authority required for sending the bulletin board message to the levels according to the authority grade of the account number. The bulletin board message is prohibited from being sent to the levels when the authority grade of the account number is inappropriate.

In various embodiments of the present invention, the aforesaid modules of the server 10 are regarded as resources for use in the coordinated operation of hardware and software, and the technical features of each module are expressed by a plurality of program instructions or part of an application, but the technical effect of each module must be achieved through the execution of the program instructions or the application (i.e., resources for use in the coordinated operation of hardware and software) by at least one processor. Related problems are solved by the present invention through the resources for use in the coordinated operation of hardware and software.

The present invention does not put any limit on the number of apparatuses on which the server 10 and the database 20 are disposed. In various embodiments of the present invention, the server 10 and the database 20 are disposed on the same apparatus. Alternatively, the server 10 and the database 20 are disposed on cluster-structured apparatuses, respectively, or on differently located cluster-structured apparatuses, respectively.

The push gateway 22 produces the push notification according to the bulletin board message and sends the push notification through an external push server 24 (such as MPNS, GCM, and APNS). In an embodiment of the present invention, the push notification related to the bulletin board message comprises partial or full contents of the bulletin board message and the push ID on the recipient push list. The push notification comprises a push notification serial number which does not repeat (or at least does not repeat within a searchable range of recent data). For example, the push ID comprises a member serial number and an international mobile equipment ID (IMEI) of the member mobile device. In the case of more than one mobile communication device 26, the push ID comprises the IMEI of the mobile communication device 26 for the latest use with the login of the database 20. In an embodiment of the present invention, the "partial or full contents of the bulletin board message" related to the push notification depends on the length of the contents of the bulletin board message. Take APNS as an example, since it allows a maximum of 256 bytes of bulletin board message content (payload), the push notification comprises the full contents of a bulletin board message when the bulletin board message has less than 256 bytes of contents, and the push notification comprises the partial contents (i.e., the first 256 bytes of contents) of a bulletin board message when the bulletin board message has more than 256 bytes of contents. In another embodiment of the present invention, the bulletin board message comprises a message subject whose push notification is sent through the message subject.

In various embodiments of the present invention, the mobile communication device 26 is a smart phone or tablet running on iOS, Android or Windows Phone. The mobile communication device 26 comprises at least one processor. The processor executes a plurality of program instructions or an application (App) 28. The resources for use in executing the application 28 by the processor comprises a second network communication module 30, a login module 32, a data access module 34, a remain-on-top management module 36, a second bulletin board module 38, and a bulletin board message entering module 40. The second network communication module 30 establishes a network connection with the first network communication module 12 of the server 10. In various embodiments of the present invention, the network connection complies with TCP protocol, HTTP protocol, or HTTPS protocol. The login module 32 receives the account number and password entered by the user (i.e., a member) through the entering interface of the mobile communication device 26 and uploads them to the server 10 for verification. In another embodiment of the present invention, the account number and password are stored temporarily in a memory of the mobile communication device 26 such that, within a specific period of (e.g., a day or a week), the user can effectuate every instance of login automatically, without entering the account number and password manually. After the data access module 34 receives the push notification, the second network communication module 30 is triggered to establish a network connection (TCP protocol, HTTP protocol or HTTPS protocol) with the first network communication module 12 of the server 10, and full contents of the bulletin board message corresponding to the push notification serial number are downloaded from the server 10, wherein the bulletin board message comprises an attribute, and the display position of the bulletin board message on the screen of the mobile communication device 26 is determined by the "display position" of the attribute.

In an embodiment of the present invention, network connection established by the second network communication module 30 and the first network communication module 12 complies with TCP protocol or WebSocket protocol (which is a type of TCP protocol operating in the form of HTTP based on a handshake sent from the client), wherein the data access module 34 downloads a bulletin board message directly. In another embodiment of the present invention, the network connection established by the second network communication module 30 and the first network communication module 12 complies with HTTP protocol or HTTPS protocol, wherein the data access module 34 downloads a bulletin board message by polling. The second bulletin board module 38 divides vertically the view displayed on the screen into the priority display block 44 and the non-priority display block 46 (shown in FIG. 3). There are two ways of disposing priority display block 44. First, the priority display block 44 is disposed above the non-priority display block 46, such that the priority display block 44 and the non-priority display block 46 do not overlap each other, with the former lying on top of the latter, wherein a vertically scrolling instruction is received for scrolling up and down the view. Second, the priority display block 44 and the non-priority display block 46 overlap each other (not shown), but the priority display block 44 is not hidden by the non-priority display block 46. The second bulletin board module 38 displays a message subject or the summary 48 of the bulletin board message in the priority display block 44 or the non-priority display block 46 in accordance with an arrangement sequence. The arrangement sequence is selected from a bulletin board message time stamp sequence and a latest reply time stamp sequence. The term "bulletin board message time stamp sequence" means "an arrangement made in accordance with the timing of producing bulletin board messages." For instance, the uppermost non-remain-on-top bulletin board message (i.e., displayed in the non-priority display block) is the latest message, whereas the leftmost remain-on-top bulletin board message (i.e., displayed in the priority display block) is the latest message. The "latest reply time stamp sequence" means "an arrangement made in accordance with the timing of the latest reply message." For instance, a non-remain-on-top bulletin board message (i.e., a bulletin board message displayed in the non-priority display block 46) carrying the latest reply is disposed at the top of the non-priority display block 46, such that a selecting instruction for the summary 48 is received so as to display the full contents of the bulletin board messages. After the mobile communication device 26 receives the push notification and downloads the bulletin board message corresponding to the push notification serial number, the remain-on-top management module 36 checks the attribute of the bulletin board message. When the display position of the attribute is "priority display block," the summary 48 of the bulletin board message is processed by the second bulletin board module 38 and displayed in the priority display block 44. When the display position of the attribute is "non-priority display block," the summary 48 of the bulletin board message is processed by the second bulletin board module 38 and displayed in the non-priority display block 46. When more than one bulletin board message is disposed in the priority display block 44, the remain-on-top management module 36 disposes another bulletin board message by transverse expansion and receives a horizontally scrolling instruction for scrolling the priority display block 44 leftward and rightward, thereby switching between the bulletin board messages. Moreover, the remain-on-top management module 36 receives a round-robin configuration instruction for starting and shutting down the automatic round-robin display of the priority display block 44. For example, if three bulletin board messages are disposed in the priority display block 44 and the round-robin is ON, the summary 48 of each bulletin board message is displayed on the screen for a while, e.g., 3 seconds, 5 seconds, or 10 seconds, before being replaced with the next one. The maximum number of bulletin board messages contained in the priority display block 44 is defined/determined by the first bulletin board module 16. For example, where the first bulletin board module 16 defines that the priority display block 44 contains a maximum of three bulletin board messages, if the new fourth bulletin board message gets made remain-on-top (i.e., by being disposed in the priority display block 44), the earliest (i.e., oldest) first bulletin board message is automatically moved to the non-priority display block 46.

In an embodiment of the present invention, the remain-on-top management module 36 receives the remain-on-top instruction and the remain-on-top cancellation instruction generated from the mobile communication device 26 operated by the user. Under the remain-on-top instruction, the bulletin board message otherwise displayed in the non-priority display block 46 is moved to the priority display block 44, and the remain-on-top instruction is uploaded to the server 10. Under the remain-on-top cancellation instruction, the bulletin board message otherwise displayed in the priority display block 44 is moved to the non-priority display block 46, and the remain-on-top cancellation instruction is uploaded to the server 10. After receiving the instruction for moving the bulletin board message to the correct block, the remain-on-top management module 36 uploads the instruction to the server 10, such that the authority management module 18 can verify whether the user has sufficient authority to configure the display position. If the user does not have any authority, the effective scope of remain-on-top configuration is restricted to the mobile communication device 26 of the configuring person. If the user has authority, the effective scope of remain-on-top configuration extends to the other members.

According to the present invention, the mobile communication device 26 for accessing the cloud 42 comprises at least one processor and a screen. The processor executes the application 28. A plurality of program instructions of the application 28 includes a first program instruction, a second program instruction, a third program instruction, and a fourth program instruction. The first program instruction instructs the mobile communication device 26 to establish a network connection with the server 10 to undergo login verification. The second program instruction instructs the mobile communication device 26 to receive the push notification and then download from the server 10 the bulletin board message corresponding to the push notification serial number. The third program instruction causes the message content to be displayed on the screen of the mobile communication device 26, wherein a view of the screen is divided into the priority display block 44 and the non-priority display block 46 disposed beneath the priority display block 44 and adapted to display a summary of the message content in accordance with an arrangement sequence. The arrangement sequence is a bulletin board message time stamp sequence or a latest reply time stamp sequence. When more than one bulletin board message is disposed in the priority display block 44, the third program instruction instructs another bulletin board message to be disposed in the priority display block by transverse expansion, receives a horizontally scrolling instruction for scrolling the priority display block 44 leftward and rightward to thereby switch between the bulletin board messages displayed in the priority display block 44, receives a vertically scrolling instruction for scrolling up and down the view, displays the summaries of the bulletin board messages in the priority display block 44 or the non-priority display block 46 in accordance with an arrangement sequence, and receives the selecting instruction of the summaries to display the bulletin board messages. The third program instruction receives a remain-on-top instruction for moving the message content displayed in the non-priority display block 46 to the priority display block 44 and uploads the remain-on-top instruction to the server 10. The third program instruction receives a remain-on-top cancellation instruction for moving the message content displayed in the priority display block 44 to the non-priority display block 46 and uploads the remain-on-top cancellation instruction to the server 10. The fourth program instruction is for use in determining whether to display a summary of the message content in the priority display block 44 or the non-priority display block 46 according to the attribute, receiving a round-robin configuration instruction for starting and shutting down automatic round-robin display of the priority display block 44, recording a "read" status and an "unread" status of the bulletin board message of the priority display block 44 in a "reading status flag" of the attribute, and checking the attribute of the bulletin board message. If the attribute indicates that the display position is the priority display block 44, the summary of the message content is displayed in the priority display block 44. If the attribute indicates that the display position is the non-priority display block 46, the summary of the message content is displayed in the non-priority display block 46.

In various embodiments of the present invention, the first program instruction, second program instruction, etc. executed by the processor are illustrative of a plurality of program instructions of the present invention rather than restrictive of their respective technical features or respective steps of the process flow of the method of the present invention. Persons skilled in the art understand that the respective technical features or respective steps of the process flow of the method with respect to the first through fourth program instructions can be combined in a manner to be expressed by different combinations of program instructions.

In another embodiment of the present invention, the resources for use in executing the application 28 by a processor of the mobile communication device 26 further comprises the bulletin board message entering module 40, wherein members using the mobile communication device 26 must have authority (i.e., appropriate authority grade) required for entering a bulletin board message. In the event of inappropriate authority, the authority management module 18 of the server 10 not only declines to process the bulletin board message but also returns and displays a system error message on the mobile communication device 26. The bulletin board message entering module 40 receives from a member an instruction for entering a new bulletin board message, including entering contents (or including a message subject) as well as configuring an attribute (for determining whether to make a bulletin board message remain-on-top) and the subjects (i.e., the recipient list) which the bulletin board messages are to be delivered to. When it is configured that the subjects of the bulletin board messages require selecting from an organization directory a specific member, a specific level of an organization, a specific group list, or all the members of an organization, the "organization directory" (or called "organization address book") is edited by a system administrator (such as a MIS engineer) with authority, whereas the other members may read or access the organization directory but cannot edit it. The specific group list is also edited by the system administrator with authority, such as "a first-class supervisor at each unit/level within the organization," "a second-class supervisor at each unit/level within the organization," and "the minor staff at each unit/level within the organization." The members on this specific group list are initially scattered at many units/levels and thus must be compiled to create the specific group list for later use.

Figure 2:
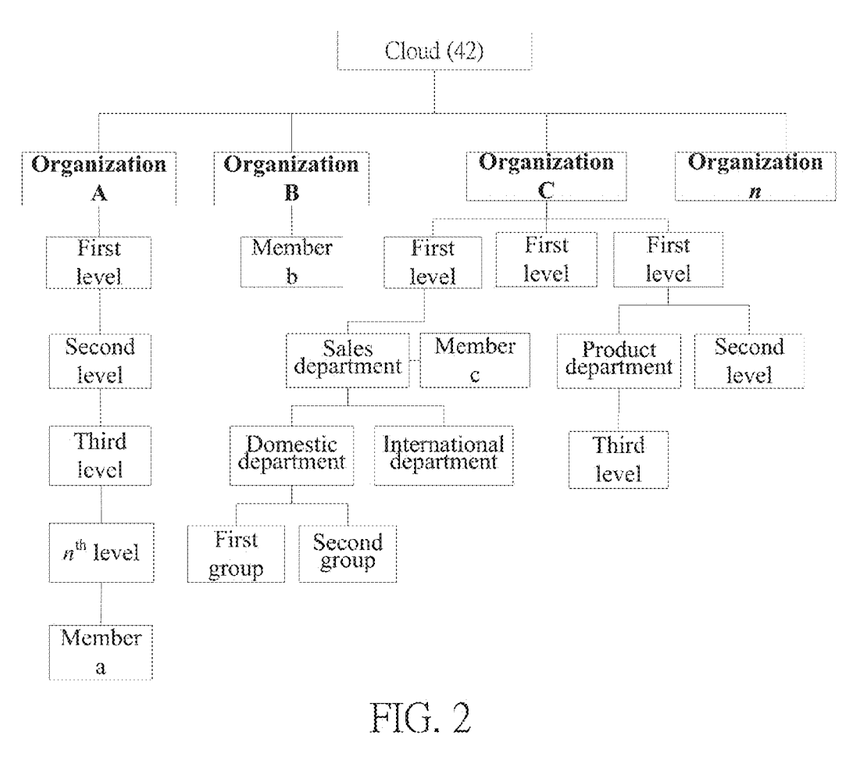
FIG. 2 is a schematic view of organizations and levels of a cloud according to an embodiment of the present invention.

Referring to FIG. 2, there is shown a schematic view of organizations and levels of the cloud 42 according to a preferred embodiment of the present invention. The cloud 42 of the present invention comprises organizations which support structures at all levels. Each organization is structured by level, ranging from a single level to a plurality of levels. The levels are followed by members, ranging from no members to a plurality of members. As shown in FIG. 2, "organization A" features a vertical (also known as high-rise or high-tower) level structure and thus fits for level classification based on members' job grades, for example, with the first level defined by "job grade 15", the second level by "job grade 14", the third level by "job grade 13", and so forth, wherein job grade 13 or higher is indicative of a high-level supervisor. According to the present invention, given the bulletin board message entering module 40, members with authority can specify the level which a new bulletin board message is sent to, for example, all high-level supervisors within the organization, i.e., first through third levels. As shown in FIG. 2, the level structure of "organization B" only has a single level and thus is suitable for any organization which has a small number of members or has a flat structure, such as a family, school club, small-sized company, small group established to promote a common hobby, etc. As shown in FIG. 2, the level structure of "organization C" is pyramidal and thus is suitable for any medium and large-sized company and group.

The jurisdiction of the authority management module 18 in an embodiment of the present invention is illustrated with an example below. Assuming that "member a" in "organization A" has a job grade of "fourth level" and an authority grade of "fourth level," the bulletin board messages sent from "member a" are restricted to "fourth level" and below, but "member a" is unable to send the bulletin board messages to "first level," "second level" or "third level." In an embodiment of the present invention, if "member a" does not have the authority to send the bulletin board messages, the authority management module 18 uses a method of limiting the execution of the bulletin board message entering module 40 by "member a" to prohibit "member a" from sending any bulletin board message. In another embodiment of the present invention, the authority management module 18 refuses to receive/process the bulletin board messages uploaded from "member a" to the server 10. Assuming that "organization B" is a single-level organization, "member b" sends the bulletin board messages to all the members of the organization if "member b" has authority to send the bulletin board messages, but "member b" does not send any bulletin board message if "member b" does not have authority to send the bulletin board messages. Assuming that "member c" in "organization C" has authority to send the bulletin board messages, "member c" can send the bulletin board messages to whatever units under its level, such as "first group," but "member c" does not have any authority to send any bulletin board message to any units, such as "product department," of the same job grade but on different branches.

Referring to FIG. 3, there is shown a schematic view of the priority display block 44 and the non-priority display block 46 according to a preferred embodiment of the present invention. As shown in the diagram, the second bulletin board module 38 divides vertically the view displayed on the screen into two parts, namely the priority display block 44 above and the non-priority display block 46 below, wherein the priority display block 44 has a larger visible area than the non-priority display block 46.

Figure 4:
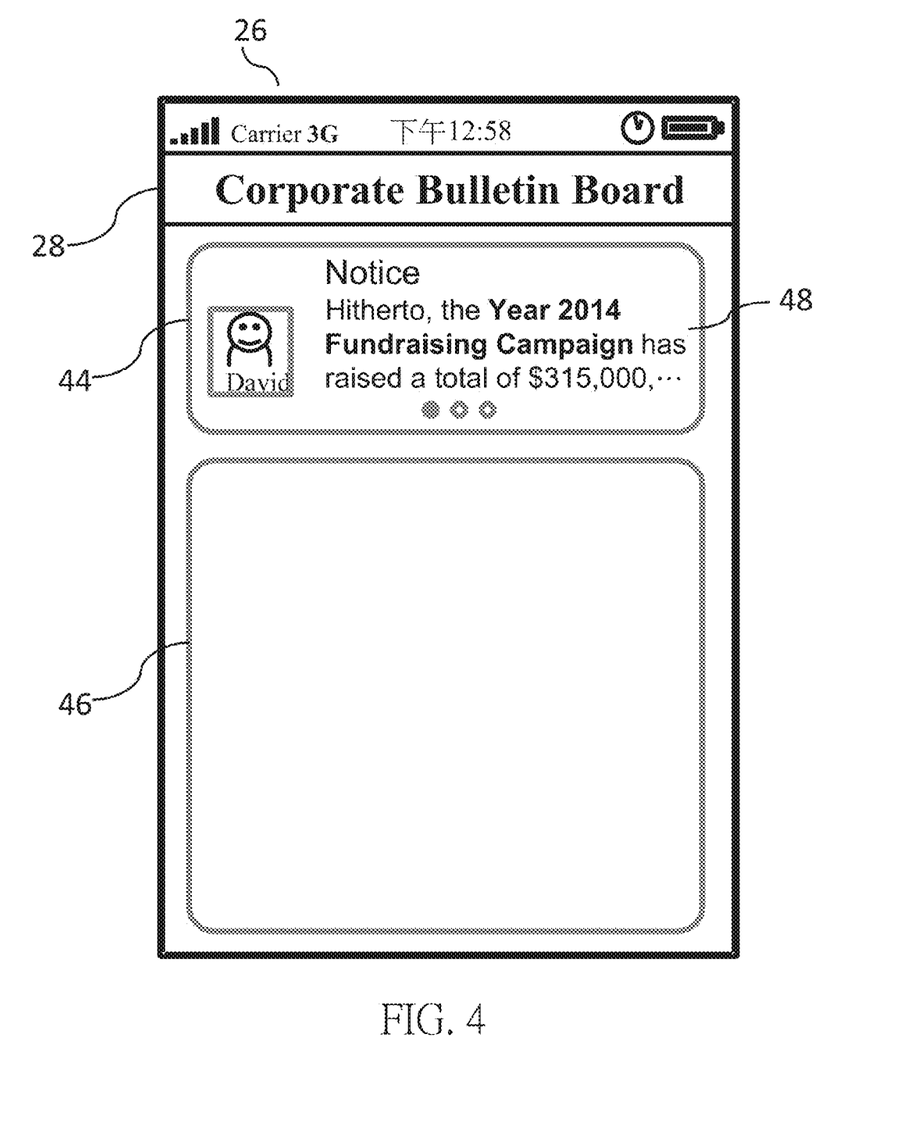
FIG. 4 is a schematic view of the priority display block with multiple messages displayed therein according to an embodiment of the present invention.
Figure 5:
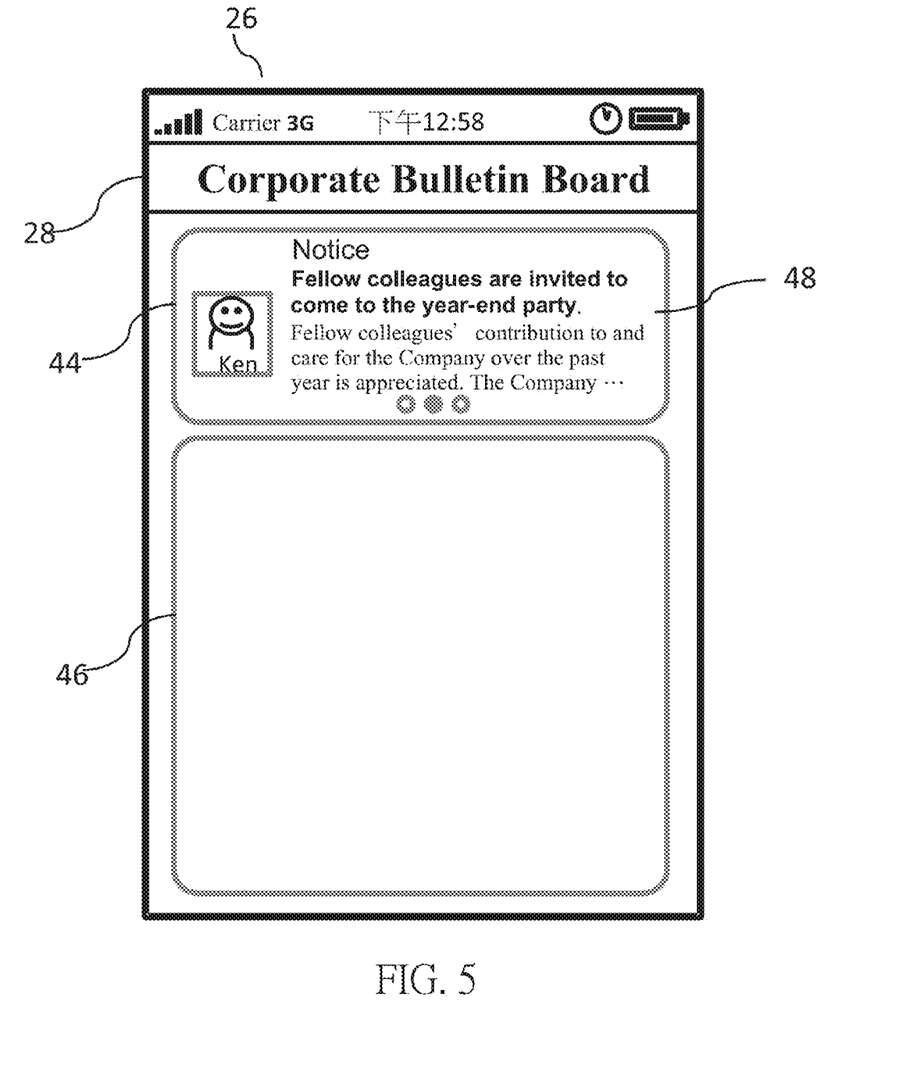
FIG. 5 is another schematic view of the priority display block with multiple messages displayed therein according to an embodiment of the present invention.

Referring to FIG. 4 and FIG. 5, there are shown schematic views of multiple bulletin board messages disposed in the priority display block 44 according to a preferred embodiment of the present invention. When more than one bulletin board message is disposed in the priority display block 44, the remain-on-top management module 36 disposes the next bulletin board message by transverse expansion and receives a horizontally scrolling instruction for scrolling the priority display block 44 leftward and rightward to thereby switch between the summaries 48 of the bulletin board messages. FIG. 4 shows that the priority display block 44 displays the summary 48 of the first bulletin board message. FIG. 5 shows that the priority display block 44 displays the summary 48 of the second bulletin board message.

Figure 6:
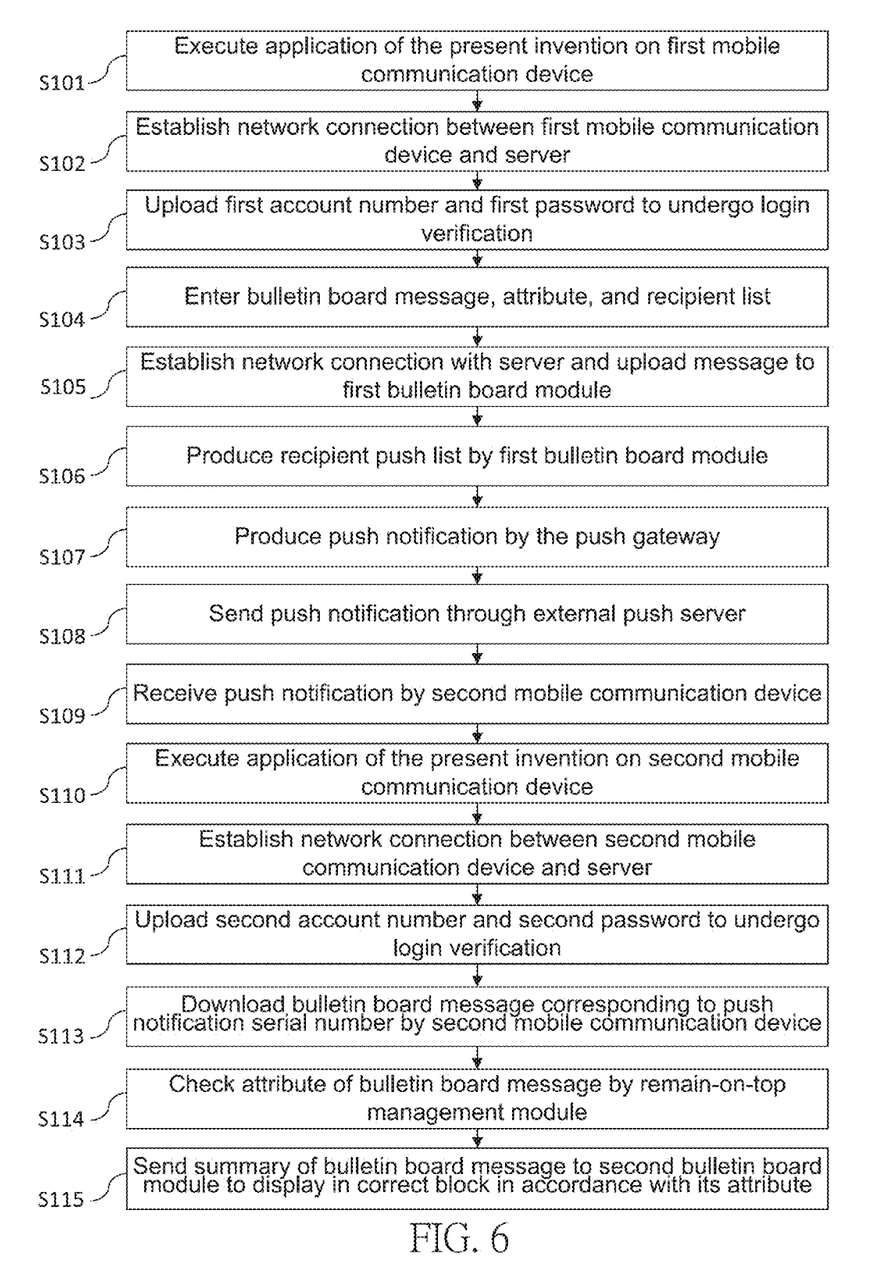
FIG. 6 is a flowchart of a method according to an embodiment of the present invention.

Referring to FIG. 6, there is shown a flowchart of a method according to an embodiment of the present invention. For instance, the process flow of the method is as follows: a first mobile communication device 26a of a member who has authority uploads a bulletin board message to the server 10, and then a second mobile communication device 26b receives the bulletin board message and displays it in the priority display block of the screen. Referring to FIG. 1, FIG. 2, FIG. 4, and FIG. 5, the method of the present invention comprises the steps described below.

Step S101: execute the application 28 on the first mobile communication device 26a. The first mobile communication device 26a is the mobile communication device 26 of the present invention, such as Apple's iPhone 5S, and the user of the first mobile communication device 26a is assumed to be the first member of "organization C".

Step S102: establish a network connection between the first mobile communication device 26a and the server 10. Upon execution of the application 28, a network connection is established between the second network communication module 30 of the application 28 and the first network communication module 12 of the server 10 of the cloud 42, wherein the network connection complies with TCP protocol (including Socket and WebSocket Connection), HTTP protocol, or HTTPS (i.e., HTTP over SSL) protocol.

Step S103: upload a first account number and a first password to undergo login verification. The first member with authority enters the first account number and the first password by the application 28 of the first mobile communication device 26a. Afterward, the first account number and the first password entered by the first member are uploaded to the server 10 by the login module 32 of the first mobile communication device 26a to undergo login verification performed by the first mobile communication device 26a and the login verification module 14. In another embodiment of the present invention, the account number and password previously entered are stored temporarily by the login module 32 within a validity period such that execution of the application 28 automatically causes the account number and password to be uploaded to the server 10 and then subjected to login verification performed by the login verification module 14.

Step S104: enter a bulletin board message, an attribute, and a recipient list. The first member enters the bulletin board message with the bulletin board message entering module 40 of the application 28 of the first mobile communication device 26a, configures the display position (that is, a priority display block and a non-priority display block) of the attribute of the bulletin board message, and specifies the subjects (i.e., the recipient list) which the bulletin board messages are to be delivered to, wherein the configuration of the subjects entails selecting specific members, levels of the organization, a specific group list, or all members within the organization from the organization directory. In this embodiment, it is assumed that the first member selects "first group" (see FIG. 2) from the organization directory and the unit comprises the second member, wherein the display position of the attribute of the bulletin board message is the "priority display block." The step is just intended to exemplify an embodiment of the present invention, wherein the sender (first member) selects any one of the multiple levels, specific member, or all the members from the organization directory. In another embodiment of the present invention, the organization is a single-level organization, and thus the corresponding step involves sending a specific member or all the members from the organization directory by the sender (first member).

Step S105: establish a network connection with the server 10 and upload a bulletin board message to the first bulletin board module 16. In step S102, if the network connection established between the second network communication module 30 and the first network communication module 12 complies with TCP protocol, the step involves uploading the bulletin board message to the first bulletin board module 16 directly. In step S102, if the network connection thus established complies with HTTP protocol or HTTPS protocol, the step involves establishing the HTTP protocol or HTTPS protocol network connection between the second network communication module 30 and the first network communication module 12 anew and then uploading the bulletin board message to the first bulletin board module 16. In an embodiment of the present invention and the corresponding step, upon completion of establishing a network connection with the server 10 and uploading the bulletin board message, the authority management module 18 checks the authority grade of the first account number in the database 20 to thereby verify whether the first account number has authority to send the bulletin board message to the selected levels. In another embodiment of the present invention and the corresponding step, after the bulletin board message has been uploaded, the authority management module 18 checks the authority grade of the first account number in the database 20 to thereby verify whether the first account number has authority to make the bulletin board message remain-on-top (i.e., setting the display position to the priority display block).

Step S106: produce a recipient push list by the first bulletin board module 16. The first bulletin board module 16 of the server 10 performs mapping according to the recipient list of the bulletin board message and thereby produces the recipient push list. The recipient push list consists of push IDs. The recipient push list comprises at least one push ID. After the recipient push list has been produced, the first bulletin board module 16 forwards the bulletin board message to the push gateway 22 for processing. In this embodiment, the recipient push list produced in the aforesaid step comprises the mobile communication device 26 of each member in "first group" under "organization C".

Step S107: produce a push notification by the push gateway 22. The push gateway 22 produces the push notification according to the bulletin board message. Depending on the length of contents, the contents of the bulletin board message related to the push notification are partial or full. When the contents of the bulletin board message exceed the length requirements of push, the push notification merely comprises the partial contents of the bulletin board message.

Step S108: send the push notification through the external push server 24. The push notification comprises push notification serial numbers which do not repeat. The external push server 24 is exemplified by MPNS, GCM, and APNS.

Step S109: receive the push notification by the second mobile communication device 26b. The second mobile communication device 26b is the mobile communication device 26 of the present invention, such as HTC OneX, and it is assumed that the user of the second mobile communication device 26b is the second member of level "first group" under "organization C".

Step S110: execute the application 28 of the present invention on the second mobile communication device 26b Step S111: establish a network connection between the second mobile communication device 26b and the server 10. The network connection complies with TCP protocol, HTTP protocol, or HTTPS protocol.

Step S112: upload a second account number and a second password to undergo login verification. The second member enters the second account number and the second password with the application 28 of the second mobile communication device 26b and then uploads the second account number and the second password to the server 10, such that the login verification module 14 performs login verification on the second account number and the second password.

Step S113: download the bulletin board message corresponding to the push notification serial number by the second mobile communication device 26b. If the network connection established between the second network communication module 30 and the first network communication module 12 in step S113 is exemplified by TCP protocol, step S113 requires the data access module 34 to download directly the bulletin board message corresponding to the push notification serial number. If the network connection established in step S113 is exemplified by HTTP protocol or HTTPS protocol, step S113 requires the second network communication module 30 to establish a network connection of HTTP protocol or HTTPS protocol with the first network communication module 12 anew before the data access module 34 downloads the bulletin board message corresponding to the push notification serial number.

Step S114: check the attribute of the bulletin board message by the remain-on-top management module 36. The options of the display position of the attribute include "priority display block" (in this embodiment) and "non-priority display block".

Step S115: send the summary 48 of the bulletin board message to the second bulletin board module 38 to display the summary 48 in the correct block in accordance with its attribute. When the display position of the attribute is "priority display block", the summary 48 is displayed in the priority display block 44 and thus presented in the form of priority display. When the display position of the attribute is "non-priority display block", the summary 48 is displayed in the non-priority display block 46 and thus not presented in the form of priority display. If more than one bulletin board message is disposed in the priority display block 44, the remain-on-top management module 36 disposes another bulletin board message by transverse expansion and starts a horizontally scrolling operation mode to receive a horizontally scrolling instruction for switching between the bulletin board messages in the priority display block 44 (as shown in FIG. 4 and FIG. 5).

The aforesaid process flow illustrates an essential feature of an embodiment of the present invention, that is, a sender predetermines whether to make a bulletin board message into a sticker. In another embodiment of the present invention, in addition to the sender, it is feasible for the other members to determine whether to make a bulletin board message into a sticker, wherein, after the remain-on-top management module 36 has received the remain-on-top instruction and the remain-on-top cancellation instruction from the user and moved the bulletin board message to the correct block, the authority management module 18 checks whether the user has sufficient authority to configure the display position and thus determines the effective scope of remain-on-top configuration.

In various embodiments of the present invention, program instructions executed by a computer can implement every block in the flowchart, a combination of the blocks in the flowchart, and the steps in every embodiment. The program instructions are provided to a processor so as to be executed by the processor to thereby produce resources required for a machine or coordinated operation of hardware and software; hence, the instructions are executed on the processor to thereby produce elements required for carrying out actions specified by the blocks in the flowchart or technical effects. Different combinations of program instructions also allow simultaneous execution of at least some operating steps specified in the blocks in the flowchart, whereas the technical solutions indicated by the first through fourth program instructions of an application may vary from embodiment to embodiment. Furthermore, it is also practicable that some of the steps are executed on one or more processors, for example, in the case of a servo computer system of multiple processors or in the case of coordinated operation of a microprocessor in a mobile communication device and a peripheral interface processor. Moreover, in the flowchart, at least one block or a combination of blocks may be performed along with the other block or the other combination of blocks simultaneously or performed in a sequence different from its specified counterpart, without departing from the spirit and scope of the present invention.

Therefore, the blocks in the flowchart of the present invention support a combination of elements required for performing specified actions or technical solutions, a combination of steps required for performing specified actions or technical solutions, and program instruction elements required for performing specified actions or technical solutions. What is also understandable is that the specified actions or technical solutions are effectuated by a combination of blocks in the flowchart as well as each block in the flowchart of the present invention through the coordinated operation of a special-purpose hardware-style system or special-purpose hardware, and program instructions.

In another embodiment of the present invention, the "read" status and "unread" status (i.e., "the status as to whether a member has read") of the bulletin board message of the priority display block 44 are recorded in the "reading status flag" of its attribute by the remain-on-top management module 36. Furthermore, in an embodiment of the present invention, after the "reading status flag" of the attribute of the priority display block changes from the "unread" status to the "read" status, the remain-on-top management module 36 automatically resets the display position of the attribute to "non-priority display block" such that the second bulletin board module 38 displays the bulletin board messages in the non-priority display block 46. In an embodiment of the present invention, different marks are assigned to "unread" and "read" bulletin board messages in the priority display block 44 so as to highlight the differences between the "unread" bulletin board messages and the "read" bulletin board messages and thereby assist the user in identifying the unread bulletin board messages quickly. For example, an "unread" mark is a "red exclamation mark" (not shown), whereas a "read" mark is a "green tick" (not shown) or any mark for distinguishing a read bulletin board message from an unread bulletin board message. In an embodiment of the present invention, the background color of "unread" bulletin board messages in the priority display block 44 is different from that of "read" bulletin board messages in the priority display block 44, such that the user can differentiate between the "unread" bulletin board messages and the "read" bulletin board messages quickly. In an embodiment of the present invention, the "reading status flag" and "background color flag" (i.e., the background color of bulletin board messages in the priority display block) are stored in the attribute.

In another embodiment of the present invention, blocks for displaying bulletin board messages are configured by flag technology; for example, the remain-on-top management module 36 reads a "remain-on-top flag" of a bulletin board message and thereby displays the bulletin board message in the priority display block 44 or the non-priority display block 46. In this embodiment, the remain-on-top management module 36 receives a remain-on-top instruction and a remain-on-top cancellation instruction generated from the mobile communication device 26 operated by the user and thereby resets the remain-on-top flag.

In conclusion, the present invention discloses a cloud system and cloud method of making messages remain on top of a mobile bulletin board, and a mobile communication device for accessing the cloud, to thereby solve the problems which confront the prior art as follows: important messages of a bulletin board, through resources available to the cloud, having attributes which are making messages remain on top compulsorily, displaying in a round-robin manner automatically and eye-catching, hardware resources of the mobile communication device can configure the important messages in such a manner that the important messages are conspicuously displayed on the screen in accordance with the attribute configuration, so that message readers can quickly spot highly graded bulletin board messages among numerous bulletin board messages, so as to avoid missing out the important messages.

The technical solution of the present invention is disclosed above by preferred embodiments. However, the preferred embodiments are not restrictive of the present invention. Slight changes and modifications can be made by persons skilled in the art to the aforesaid embodiments without departing from the spirit of the present invention and shall still fall within the scope of the present invention. Accordingly, the legal protection for the present invention should be defined by the appended claims.

What is claimed is:

1. A system of making messages remain on top of a mobile bulletin board, the system comprising:
a database for storing at least one bulletin board message and a plurality of members' information, wherein the bulletin board message comprises a message content, an attribute, and a recipient list selected from a level and the members' information;
a server for accessing the database, comprising:
a first network communication hardware module having a network connection with a mobile communication device associated with one of the members' information; and
a first processor set having at least one processor for executing a plurality of program instructions comprising:
a login verification program instruction for verifying the mobile communication device connects with the server through a network; and
a first bulletin board program instruction for producing a recipient push list according to the recipient list, wherein the recipient push list comprises at least one push ID corresponding to one of the members' information; and
a push gateway for producing a push notification according to the bulletin board message and sending the push notification to the mobile communication device corresponding to the recipient push list through an external push server,
wherein, after the mobile communication device downloads the bulletin board message from the server in accordance with the push notification, the mobile communication device determines whether to display a summary of the message content in a priority display block according to the attribute; and
wherein the attribute of the bulletin board message is selected from a display position, a remain-on-top flag, a background color flag, and a reading status flag.

2. The system of claim 1, wherein the members' information each specify an account number, an organization, and an authority grade, with the organization being one of a single-level organization and a multi-level organization.

3. The system of claim 2, wherein the recipient push list requires selecting the specific members' information, the specific levels of the organization, a specific group list, or all the members' information of the organization from an organization directory.

4. The system of claim 2, wherein the first processor set further executes an authority management program instruction for responding to a remain-on-top instruction or a remain-on-top cancellation instruction and thereby resetting a display position of the message content.

5. The system of claim 4, wherein the authority management program instruction resets the display position of the message content according to the authority grade.

6. The system of claim 2, wherein the first processor set further executes an authority management program instruction for managing authority required for sending the bulletin board message to the levels according to the authority grade associated with the message content.

7. The system of claim 1, wherein the mobile communication device comprises a second processor set having at least one processor for executing a plurality of program instructions comprising: a first program instruction for instructing the mobile communication device to establish a network connection with the server and thereby undergo login verification; a second program instruction for instructing the mobile communication device to receive the push notification and then download from the server the bulletin board message corresponding to the push notification serial number; a third program instruction for instructing the mobile communication device to display the message content on a screen, wherein a view of the screen is divided into the priority display block and a non-priority display block; and a fourth program instruction for determining whether to display the summary of the message content in the priority display block or the non-priority display block according to the attribute.

8. The system of claim 7, wherein the third program instruction receives a vertically scrolling instruction for scrolling up and down the view, displays the summary of the message content in the priority display block or the non-priority display block in accordance with an arrangement sequence, and receives a selecting instruction for the summary so as to display the full contents of the bulletin board messages.

9. The system of claim 8, wherein the fourth program instruction records a "read" status and an "unread" status of the bulletin board message of the priority display block in a "reading status flag" of the attribute.

10. The system of claim 9, wherein, when the reading status flag of the bulletin board message changes from the "unread" status to the "read" status, the fourth program instruction automatically resets the display position of the attribute to the non-priority display block, whereas the third program instruction removes the summary of the message content from the priority display block and displays the summary in the non-priority display block.

11. The system of claim 7, wherein the third program instruction displays the summary of the message content in accordance with an arrangement sequence, and the arrangement sequence is selected from a bulletin board message time stamp sequence and a latest reply time stamp sequence.

12. The system of claim 7, wherein the fourth program instruction receives a round-robin configuration instruction for starting and shutting down automatic round-robin display of the priority display block.

13. The system of claim 7, wherein, when more than one said bulletin board message is disposed in the priority display block, the third program instruction instructs another said bulletin board message to be disposed in the priority display block by transverse expansion and receives a horizontally scrolling instruction to thereby scroll the priority display block leftward and rightward, thereby switching between the bulletin board messages displayed in the priority display block.

14. The system of claim 7, wherein the priority display block displays the message content of multiple said bulletin board messages.

15. The system of claim 7, wherein the fourth program instruction checks the attribute of the bulletin board message, displays the summary of the message content in the priority display block when the attribute indicates that the display position is the priority display block, and displays the summary of the message content in the non-priority display block when the attribute indicates that the display position is the non-priority display block.

16. The system of claim 1, wherein the first bulletin board program instruction receives the bulletin board message uploaded from the members' information and writes the bulletin board message to the database.

17. The system of claim 1, wherein the push notification comprises a push notification serial number, and the mobile communication device downloads from the server the bulletin board message corresponding to the push notification serial number.

18. A method of making messages remain on top of a mobile bulletin board, applicable to a cloud formed from a database, a server, and a push gateway, the method comprising the steps of:
storing at least one bulletin board message and a plurality of members' information in the database, wherein the bulletin board message comprises a message content, an attribute, and a recipient list selected from a level and the members' information;
establishing a network connection between the server and a mobile communication device associated with one of the members' information, followed by verifying login of the mobile communication device by the server;
receiving the bulletin board message uploaded by the mobile communication device and writing the bulletin board message to the database, by the server;
producing a recipient push list by the server according to the recipient list, wherein the recipient push list comprises at least one push ID corresponding to one of the members' information;
producing a push notification by the push gateway according to the bulletin board message, followed by sending the push notification to the mobile communication device corresponding to the recipient push list through a push server; and
providing by the server the bulletin board message corresponding to the push notification, so as for the bulletin board message to be downloaded by the mobile communication device corresponding to one of the members' information,
wherein, after the mobile communication device has downloaded the bulletin board message from the server in accordance with the push notification, the mobile communication device determines whether to display a summary of the message content in a priority display block according to the attribute; and
wherein the attribute of the bulletin board message is selected from a display position, a remain-on-top flag, a background color flag, and a reading status flag.

19. The method of claim 18, wherein the members' information each specify an organization and an authority grade, with the organization selected from a single-level organization and a multi-level organization.

20. The method of claim 19, wherein the recipient push list comprises specific members' information, specific levels of the organization, a specific group list, or all the members' information of the organization which are selected from an organization directory.

21. The method of claim 19, further comprising the step of resetting a display position of the message content by the server in response to a remain-on-top instruction and a remain-on-top cancellation instruction.

22. The method of claim 21, further comprising the step of resetting the display position of the message content by the server according to the authority grade.

23. The method of claim 19, further comprising the step of managing by the server an authority for sending the message content to the level according to publication of the authority grade associated with the message content.

24. The method of claim 18, wherein the push notification comprises a push notification serial number, and the mobile communication device downloads the bulletin board message from the server in accordance with the push notification serial number.

25. The method of claim 18, wherein the mobile communication device comprises at least one processor for executing a plurality of program instructions including: a first program instruction for establishing a network connection between the mobile communication device and the server to undergo login verification; a second program instruction for instructing the mobile communication device to download from the server the bulletin board message corresponding to a push notification serial number after receiving the push notification; a third program instruction for instructing the mobile communication device to display the message content on a screen, wherein a view of the screen is divided into the priority display block and a non-priority display block disposed beneath the priority display block; and a fourth program instruction for determining whether to display the summary of the message content in the priority display block or the non-priority display block according to the attribute.

26. The method of claim 25, wherein, when more than one said bulletin board message is disposed in the priority display block, the third program instruction enables another bulletin board message to be disposed by transverse expansion and starts a horizontally scrolling operation mode to receive a horizontally scrolling instruction, thereby switching between the bulletin board messages displayed in the priority display block.

27. The method of claim 25, wherein the fourth program instruction records a "read" status and an "unread" status of the bulletin board message of the priority display block in a "reading status flag" of the attribute.

28. The method of claim 27, wherein, when the reading status flag of the bulletin board message changes from the "unread" status to the "read" status, the display position of the attribute is reset to the non-priority display block, whereas the summary of the message content is removed from the priority display block and displayed in the non-priority display block.

29. The method of claim 25, wherein the priority display block displays the message content of multiple said bulletin board messages.

30. The method of claim 25, further comprising the step of receiving a remain-on-top instruction by the third program instruction, moving the message content otherwise displayed in the non-priority display block to the priority display block, and uploading the remain-on-top instruction to the server.

31. The method of claim 25, further comprising the step of receiving a remain-on-top cancellation instruction by the third program instruction, moving the message content otherwise displayed in the priority display block to the non-priority display block, and uploading the remain-on-top cancellation instruction to the server.

32. The method of claim 25, further comprising the step of receiving a vertically scrolling instruction for scrolling up and down the view by the third program instruction, displaying the summary of the message content in one of the priority display block and the non-priority display block in accordance with an arrangement sequence, and receiving a selecting instruction for the summary so as to display the full contents of the bulletin board messages.

33. The method of claim 25, further comprising the step of checking the attribute of the bulletin board message by the fourth program instruction, displaying the summary of the message content in the priority display block when the display position of the attribute is the priority display block, and displaying the summary of the message content in the non-priority display block when the display position of the attribute is the non-priority display block.

34. A method of making messages remain on top of a mobile bulletin board, applicable to a mobile communication device for accessing a cloud, with the cloud formed from a database, a server, and a push gateway, the database storing at least one bulletin board message and a plurality of members' information, the bulletin board message comprising a message content, an attribute, and a recipient list, with the mobile communication device having a screen and executing an application to implement the method, the method comprising the steps of:
　　receiving a push notification by the mobile communication device associated with one of the members' information, wherein the push notification comprises a push notification serial number;
　　establishing a network connection with the server to thereby undergo login verification;
　　downloading from the server the bulletin board message corresponding to the push notification serial number;
　　displaying the message content on the screen, wherein a view of the screen is divided into a priority display block and a non-priority display block disposed beneath the priority display block; and
　　determining whether to display a summary of the message content in the priority display block or the non-priority display block according to the attribute;
　　wherein a "read" status and an "unread" status of the bulletin board message of the priority display block are recorded in a "reading status flag" of the attribute.

35. The method of claim 34, further comprising the step of checking the attribute of the bulletin board message, displaying the summary of the message content in the priority display block when a display position of the attribute is the priority display block, and displaying the summary of the message content in the non-priority display block when the display position of the attribute is the non-priority display block.

36. The method of claim 34, wherein, when more than one said bulletin board message is disposed in the priority display block, another bulletin board message is disposed by transverse expansion, and a horizontally scrolling operation mode is started, so as to receive a horizontally scrolling instruction for switching between the bulletin board messages displayed in the priority display block.

37. The method of claim 1, wherein, when the reading status flag of the bulletin board message changes from the "unread" status to the "read" status, the display position of the attribute is reset to the non-priority display block, and the summary of the bulletin board message is removed from the priority display block and displayed in the non-priority display block.

38. The method of claim 34, wherein the priority display block displays the message content of multiple said bulletin board messages.

39. The method of claim 34, further comprising the step of receiving a remain-on-top instruction, moving the message content otherwise displayed in the non-priority display block to the priority display block, and uploading the remain-on-top instruction to the server.

40. The method of claim 34, further comprising the step of receiving a remain-on-top cancellation instruction, moving the message content otherwise displayed in the priority display block to the non-priority display block, and uploading the remain-on-top cancellation instruction to the server.

\* \* \* \* \*